(12) United States Patent
Kim

(10) Patent No.: US 6,317,225 B1
(45) Date of Patent: Nov. 13, 2001

(54) TECHNIQUE AND APPARATUS FOR DISCONTINUING SCANNING UPON A DETERMINATION THAT A REVERSE SIDE OF A DOCUMENT HAS BEEN SCANNED

(75) Inventor: Dong-Youl Kim, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/987,856

(22) Filed: Dec. 9, 1997

(30) Foreign Application Priority Data

Dec. 12, 1996 (KR) .................................................. 96-64863

(51) Int. Cl.[7] .................................................. H04N 7/40
(52) U.S. Cl. .................................................. 358/448; 358/404
(58) Field of Search .................................................. 358/448, 404, 358/474, 486, 488, 523, 529, 500, 505

(56) References Cited

U.S. PATENT DOCUMENTS

| | | | |
|---|---|---|---|
| 4,839,740 | 6/1989 | Yoshida | 355/255 |
| 4,975,783 | * 12/1990 | Tatsuo | 358/404 |
| 5,298,937 | 3/1994 | Telle | 355/233 |
| 5,347,351 | * 9/1994 | Morita | 355/313 |
| 5,392,135 | 2/1995 | Amemiya | 355/444 |
| 5,481,354 | 1/1996 | Nakajima | 355/324 |
| 5,488,485 | * 1/1996 | Amemiya | 358/444 |
| 5,889,595 | * 3/1999 | Kim | 358/437 |

* cited by examiner

Primary Examiner—Jerome Grant, II
Assistant Examiner—Negussie Worku
(74) Attorney, Agent, or Firm—Robert E. Bushnell, Esq.

(57) ABSTRACT

A technique for scanning a reverse side of a document in a scanner provided with a plurality of documents and discontinuing scanning of the document subsequent to completion of a determination that the reverse side of the document has been scanned in a scanner, thereby beforehand preventing unnecessary power consumption and consumption of consumables due to unnecessary scanning of the document by; initiating scanning of the document; determining whether an amount of black data of the scanned document generated by scanning of the document is less than a predetermined minimum amount of black data; if the amount of black data of the scanned document is not less than the predetermined minimum amount of black data, continuing scanning of the document to proceed with a next document for scanning; if the amount of black data of the scanned document is less than the predetermined minimum amount of black data, making an indication so as to inform a user that scanning of the reverse side of the document has been completed; and discontinuing scanning of the document subsequent to completion of the indication on a display of the scanner.

16 Claims, 2 Drawing Sheets

TECHNIQUE AND APPARATUS FOR DISCONTINUING SCANNING UPON A DETERMINATION THAT A REVERSE SIDE OF A DOCUMENT HAS BEEN SCANNED

CLAIM OF PRIORITY

This application makes reference to, incorporates the same herein, and claims all benefits accruing under 35 U.S.C. §119 from an application for METHOD FOR SCANNING REVERSE SIDE OF DOCUMENT IN SCANNER earlier filed in the Korean Industrial Property Office on the $12^{th}$ of December 1996 and there duly assigned Ser. No. 64863/1996.

BACKGROUND OF THE INVENTION

1. Field of the Invention

The present invention relates to a scanning technique and, more specifically, to a technique for discontinuing scanning upon a determination that a reverse side of a document has been scanned in a scanner.

2. Description of the Related Art

In general, while one side of a document (hereinafter called a 'front side') includes an image for scanning, that is, black characters, tables, and graphics on white printing papers, the other side thereof (hereinafter called a 'back or reverse side') includes no image for scanning.

Namely, since a typical scanner scans one side of the document, a user performing the scanning operation uses the document whose front side has the image for scanning composed of black and white and the back side has a white image.

When the user inserts the document into the scanner, he must arrange the document and insert the document into scanner so as to scan the front side of the document. However, when the user is not accustomed to using the scanner or carelessly inserts the document wrong side up, the scanner scans the back side of the document.

Upon the user mistakenly inserting the document wrong side up into the scanner as described above, the scanner can not recognize the wrong insertion of the document, thereby unnecessarily scanning the back side of the document. Therefore, it results in power consumption, consumption of consumables, and so on. Further, in case of successively scanning a plurality of pages of the document, the problems, such as unnecessary power consumption and the consumption of consumables, increase more and more seriously.

Furthermore, the scanning of the back side of the document in a mechanism including the scanner, not a single scanner, causes another problem.

For instance, when the back side of the document in a copying mechanism including the scanner is scanned, the copying mechanism outputs the copied materials according to the back side of the document. Because the back side of the document in the copied materials according to the back side of the document is white, there is no image in the copied materials. As a result, it causes unnecessary power consumption and consumption of consumables due to the output of the copied materials which have no image from the copying mechanism.

Also, when the back side of the document in a facsimile system including the scanner is scanned, the facsimile system transmits the scanning data according to the back side of the document, to a place which the user determines beforehand. At this moment, since the back side of the document has no image for transmission, a receiving unit can not receive the image for transmission from a transmitting unit. In this case, it is troublesome for the transmitting unit to retransmit the document and thus, the user of the transmitting unit has to pay the communication costs for the unnecessary transmission.

As stated previously, when the document is inserted wrong side up into the scanner due to the mistake of the user, the scanner performs unnecessary scanning, thereby raising problems such as unnecessary power consumption and the consumption of consumables.

The patent to Yoshida, U.S. Pat. No. 4,839,740, entitled *Image Processing Apparatus For Determining The Presence Or Absence Of An Image On Each Side Of A Plurality Of Originals Prior To Producing Two-Sided Copies Of The Originals To Avoid Producing Any Copies With Blank Sides*, discloses an image processing apparatus which determines the presence or absence of an image on each of a plurality of originals prior to producing two sided copies of the originals to avoid producing any copies with blank sides.

The two patents to Amemniya, U.S. Pat. Nos. 5,488,485 and 5,392,135 entitled respectively *Image Reading Apparatus, and Image Reading Apparatus Having Different Reading Speeds*, and the patents to Nakajima and Morita et al., U.S. Pat. Nos. 5,481,354 and 5,347,351, entitled respectively *Image Forming Apparatus, and Image Forming Apparatus For Copying One And Two-Sided Documents*, each disclose image reading or image forming apparatus in which the front side of the document is distinguished from the back side thereof. Similarly, the patent to Telle, U.S. Pat. No. 5,298,937, entitled *High Productivity Method And Apparatus For Scanning Simplex Or Duplex Originals*, also discloses distinguishing the front side from the back side of a document. I have noticed that the foregoing reference seem to lack an efficacious arrangement in which scanning is stopped upon a determination that the back side of the document has been scanned.

SUMMARY OF THE INVENTION

It is an object of the present invention to provide a technique for scanning a reverse side of document and discontinuing scanning of the document subsequent to a determination that the reverse side of the document has been scanned in a scanner, thereby beforehand preventing unnecessary power consumption and consumption of consumables due to unnecessary scanning of at the document.

In order to achieve the above object, the present invention is provided with a method for discontinuing scanning upon a determination that a reverse side of a document has been scanned in a scanner provided with a plurality of documents for scanning, including the steps of: initiating scanning of the document; determining whether an amount of black data of the scanned document generated by scanning of the document is less than a predetermined minimum amount of black data; if the amount of black data of the scanned document is not less than the predetermined minimum amount of black data, continuing scanning of the document to proceed with a next document for scanning; if the amount of black data of the scanned document less than the predetermined minimum amount of black data, making an indication in the scanner so as to inform a user that scanning for the reverse side of the document has been completed; and discontinuing scanning of the document subsequent to completion of the indication on a display of the scanner.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT(S)

Figure 1:
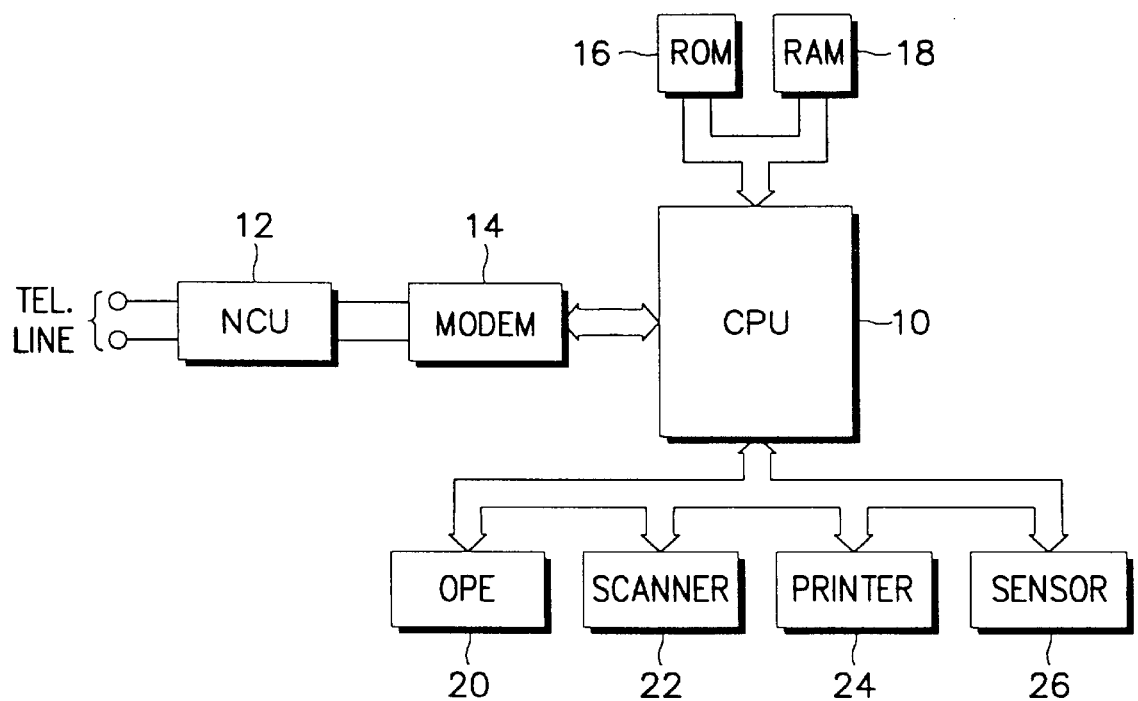
FIG. 1 is a block diagram showing a facsimile system.

Hereinafter, a preferred embodiment of the present invention will be concretely explained with reference with accompanying drawings. Most of all, throughout the drawings, it is noted that the same reference numerals or letters will be used to designate like or equivalent elements having the same function.

A preferred embodiment of the present invention in a facsimile system as a kind of the mechanism including the scanner will be explained by way of an example, hereinafter.

FIG. 1 is a block diagram showing a facsimile system. In FIG. 1, a CPU (central processing unit) 10 of the facsimile system controls the overall operation of the facsimile system according to a given program. An NCU (network control unit) 12 connects a telephone line with a modem 14 under the control of the CPU 10, shapes a transmitting loop, and interfaces a modulation output signal of the modem 14 and an analog demodulation signal input from the telephone line. The modem 14 analog-modulates and outputs the output data under the control of the CPU 10, and demodulates and outputs the analog reception input. A ROM (read only memory) 16 stores the control program of the CPU 10. A RAM (random access memory) 18 stores the transmitting and receiving data of the facsimile system. An OPE (operational panel) 20 includes a plurality of keys for interface between the user and the CPU 10 and a display for displaying the control state of the facsimile system under the control of the CPU 10.

A scanner 22 scans the document and outputs the digital scanning data to the CPU 10 under the control of the CPU 10. A printer 24 prints the image data under the control of the CPU 10. A sensor 26 senses the states of all of the units of the facsimile system and provides the sensed information to the CPU 10.

Figure 2:
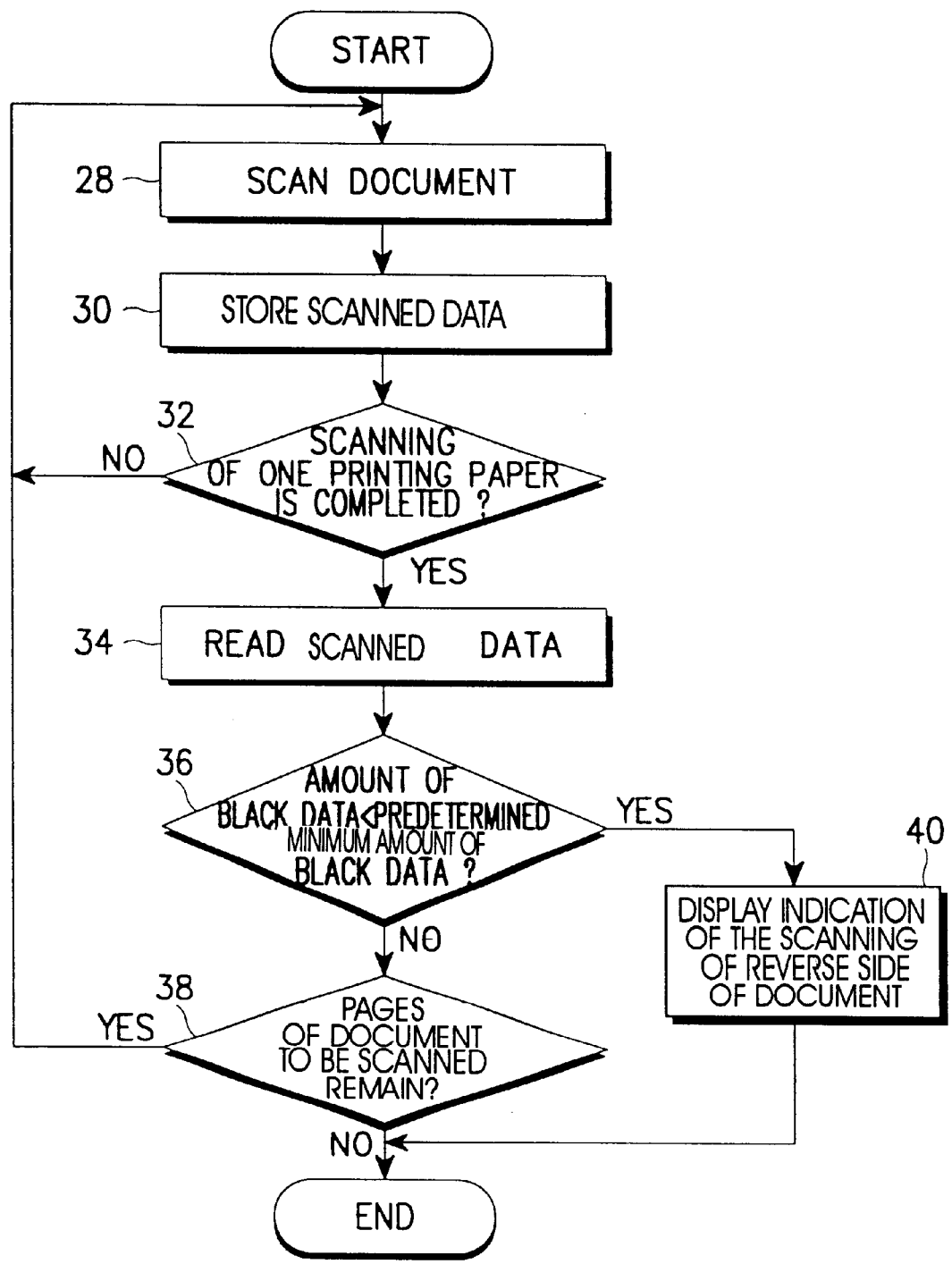
FIG. 2 is a flowchart showing the method for scanning a reverse side of a document in a scanner according to a preferred embodiment of the present invention.

The facsimile system as described above transmits the document or scans the document in the event of performing a printing operation. FIG. 2 is a flowchart showing the method for scanning the reverse side of the document in the scanner according to a preferred embodiment of the present invention. At step 28 of FIG. 2, the CPU 10 drives the scanner 22 and initiates scanning of the document inserted by the user into the scanner. Thus, upon initiation of the scanning of the document, the CPU 10 performs step 30. At step 30, the CPU 10 stores the scanned document data generated by the scanning of the document in the RAM 18 to thereby proceed to step 32. At step 32, the CPU 10 determines whether or not the scanning for one printing paper has been completed. When the scanning for one printing paper has been completed, the CPU 10 proceeds to step 34. However, when the scanning for one printing paper has not been completed, the CPU 10 returns to step 28, thereby completing the scanning for one printing paper.

At step 34 of FIG. 2, the CPU 10 reads the scanned data stored in the RAM 18. When the reading of the scanned data has been completed, the CPU 10 proceeds to step 36, thereby determining whether or not an amount of black data in the scanned document corresponding to the stored scanned data for the document is less than a is predetermined minimum amount of black data.

Conventionally, the front side of the document for transmission to the facsimile system includes an image such as black characters, tables, and graphics on white paper. Accordingly, there are white data and black data in the scanned document for scanning of the front side of the document. However, in case of scanning the white reverse side of the document, the scanned document is composed of only white data.

In accordance with this, the present invention can detect an amount of the black data in the scanned document, and recogniizes the completion of the scanning of the reverse side of the document when the amount of black data is so low as to be too low to correspond to the scanning of the front side of the document. The threshold amount of black data corresponding to the scanning of the front side of the document is referred to as a predetermined minimum amount of black data and can, for example, also correspond to a predetermined data level of printed image data to be scanned from a reverse side of a document sheet scanned on the scanner.

At step 36, the CPU 10 checks whether or not the amount of black data in the scanned document is less than the predetermined minimum amount of black data. At this point, when the amount of black data therein was less than the predetermined minimum amount of black data, the CPU 10 proceeds to step 40. However, when the amount of black data therein data was not less than the predetermined minimum amount of black data, the CPU 10 proceeds to step 38. At step 38, the CPU 10 checks whether or not pages of the document to be scanned remain. Thus, when checked that a page of the document to be scanned remains, the CPU 10 returns to step 28. To the contrary, when a page of the document to be scanned did not remain, the CPU 10 ends the above operation.

At step 40, the CPU 10 transmits the display data for displaying an indication of the scanning of the reverse side of the document to the OPE 20. The OPE 20 displays an indication of the scanning of the reverse side of the document according to the display data. Also, the CPU 10 no longer performs scanning.

As is apparent from the foregoing, the present invention can scan the reverse side of the document in the scanner, makes an indication so as to inform a user that the scanning for the reverse side of the document has been completed, and discontinuing scanning of the document subsequent to completion of the indication on a display of the scanner. Accordingly, in the event that the user inadvertently inserts a plurality of documents wrong side up, the present invention can prevent continuous unnecessary scanning of the documents. Further, upon copying a plurality of the documents or transmitting a plurality of the documents through the facsimile system, the present invention can prevent unnecessary copying or transmission by discontinuing of copying and transmission upon a document being inserted wrong side up.

As stated hereinabove, the present invention can prevent the unnecessary scanning of the reverse side of the document and useless copying or transmission of the reverse side thereof.

It should be understood that the present invention is not limited to the particular embodiment disclosed herein as the best mode contemplated for carrying out the present invention, but rather that the present invention is not limited to the specific embodiments described in this specification, except as defined in the appended claims.

What is claimed is:

1. A method of discontinuing scanning upon a determination that a reverse side of a document has been scanned, comprising the steps of:

initiating scanning of and scanning a document in a scanner for scanning;

determining whether an amount of black data corresponding to images borne by the document generated by scanning of the document is less than a predetermined minimum amount of black data;

when said amount of black data corresponding to said images borne by the document is not less than said predetermined minimum amount of black data, continuing by initiating scanning of and scanning an next document for scanning when a plurality of documents are to be scanned;

when said amount of black data corresponding to said images borne by the document is less than said predetermined minimum amount of black data, providing an indication to inform a user that scanning for the reverse side of the document has been completed;

discontinuing any copying and an transmitting of the document when said indication is provided; and discontinuing scanning of any next and any followings document when a plurality of documents are to be scanned and when said indication is provided.

2. The method as defined in claim 1, further comprised of setting said predetermined minimum amount of black data to correspond to a predetermined data level of printed image data to be scanned from a reverse side of a document sheet scanned on the scanner.

3. A method of discontinuing scanning upon a determination that a reverse side of a page of a document has been scanned, comprising the steps of:

initiating scanning of and scanning a page of a document in a scanner for scanning;

storing scanned data of the page scanned of the document in a memory;

determining whether the scanning of the page scanned of the document has been completed;

reading from the memory the stored scanned data corresponding to the page scanned of the document;

when the scanning of the page scanned of the document has been completed, determining whether an amount of black data of the page scanned of the document corresponding to the stored scanned data of the page scanned of the document, generated by scanning of the page scanned of the document, is less than a predetermined minimum amount of black data;

when said amount of black data of the page scanned of the document is not less than said predetermined minimum amount of black data, determining whether an additional page of the document is to be scanned and, when so, continuing by initiating scanning of and scanning any next additional page of the document;

when said amount of black data of the page scanned of the document is less than said predetermined minimum amount of black data, providing an indication so as to inform a user that scanning for the reverse side of the page scanned of the document has been completed;

discontinuing any copying and any transmitting of the page scanned of the document when said indication is provided; and discontinuing scanning of any next and any following additional page of the document when said indication is provided.

4. The method as defined in claim 3, further comprised of said predetermined minimum amount of black data corresponds to a predetermined data level of printed image data to be scanned from a reverse side of a document sheet scanned on the scanner.

5. The method as defined in claim 1, further comprised of said user being informed that scanning for the reverse side of the document has been completed on a display of the scanner.

6. The method as defined in claim 2, further comprised of said user being informed that scanning for the reverse side of the document has been completed on a display of the scanner.

7. The method as defined in claim 3, further comprised of said user being informed that scanning for the reverse side of the page scanned of the document has been completed on a display of the scanner.

8. The method as defined in claim 4, further comprised of said user being informed that scanning for the reverse side of the page scanned of the document has been completed on a display of the scanner.

9. An apparatus for discontinuing scanning upon a determination that a reverse side of a page of a document has been scanned, comprising:

means for initiating scanning and for scanning of a page of a document in a scanner for scanning;

means for storing scanned data of the page scanned of the document;

means for determining whether the scanning of the page scanned of the document has been completed;

means for reading the stored scanned data corresponding to the page scanned of the document from the means for storing;

control means for determining from the stored scanned data for the page scanned of the document whether an amount of black data derived during said scanning from images borne by black data of the page scanned of the document is less than a predetermined minimum amount of black data when the scanning of the page scanned of the document has been completed, for determining whether any additional page of the document remains to be scanned, and for initiating and for continuing scanning of any next additional page of the document when said amount of black data of the page scanned of the document is not less than said predetermined minimum amount of black data; and an indicator for generating an indication to inform a user that scanning for the reverse side of the page scanned of the document has been completed when said amount of black data of the page scanned of the document is less than said predetermined minimum amount of black data;

said control means discontinuing any copying and any transmitting of the page scanned of the document when said indicator generates said indication; and said control means discontinuing scanning of any next and any following additional page of the document when said indicator generates said indication.

10. The apparatus as defined in claim 9, further comprised of said control means establishing said predetermined minimum amount of black data to correspond to a predetermined data level of printed image data to be scanned from a reverse side of a document sheet scanned on the scanner.

11. The apparatus as defined in claim 10, further comprised of said apparatus being a facsimile system.

12. The apparatus as defined in claim 9, further comprised of said apparatus being a facsimile system.

13. The method as defined in claim 1, further comprised of said method of discontinuing scanning being for use in a facsimile system.

14. The method as defined in claim 2, further comprised of said method of discontinuing scanning being for use in a facsimile system.

15. The method as defined in claim 3, further comprised of said method of discontinuing scanning being for use in a facsimile system.

16. The method as defined in claim 4, further comprised of said method of discontinuing scanning being for use in a facsimile system.

* * * * *